UNITED STATES PATENT OFFICE.

HENRY C. OTTO, OF PHILADELPHIA, PENNSYLVANIA.

IMPROVEMENT IN MODES OF PREPARING A WHITE PAINT FOR PAINTING HOUSES, WALLS, &c.

Specification forming part of Letters Patent No. 2,470, dated February 28, 1842.

*To all whom it may concern:*

Be it known that I, HENRY C. OTTO, of the city of Philadelphia, in the State of Pennsylvania, have invented a new and useful Manner of Preparing a White Paint or Composition of Matter for Painting Houses, Walls, and other articles; and I do hereby declare that the following is a full and exact description thereof.

The composition of matter that I use consists mainly of linseed-oil, which is bleached and prepared by a process to be presently described, of spirits of turpentine, of white lead, and of a resin known under the name of "gum-dammar," or more generally by the commercial name of "soft South American copal." The latter material has hitherto been employed only in mixture with the proper gum-copal or with other more costly resins on account of its cheapness; but instead of improving the varnishes into which it has been introduced it has, like the introduction of common resin, served only to deteriorate them; but in the combination in which I employ it it imparts a peculiar enamel-like gloss to the paint, differing from and superior to any other article with which I am acquainted, and that at a diminished cost.

One of the most important points in the preparation of my white paint is in the manner in which I clarify and bleach the linseed-oil. In this part of the process I take, say, one gallon of linseed-oil, which I put into a clean brass, copper, or other suitable vessel with some crust of rye bread and place it on the fire and let it heat until the crust becomes burned. I then by degrees mix in half a pound of white vitriol, (sulphate of zinc,) after which I remove the oil from the fire and allow it to remain at rest for three or four days, in which time it will be perfectly clarified and fit for immediate use and will be found to work better in the paint prepared by its aid than that mixed with oil clarified in any other mode, and also to possess properties without which my white paint will loose much of its value.

In painting houses, walls, and other articles white I usually give to the work two coats of paint of good white lead, ground and mixed with my clarified oil and with spirits of turpentine in the usual way, and after this I lay on my prepared compound of white paint, to which compound I give the name of "China gloss," and which I prepare in the following manner: I take five and a half pounds of the above-named gum-dammar and melt it over a clear fire in a brass or copper kettle or other suitable vessel. When melted I remove it from the fire and add to it gradually one gallon of turpentine, and after this half a pint of my clarified oil. To five pounds of pure white lead ground up with the necessary quantity of spirits of turpentine I then add one gallon of the varnish prepared as above described, and this constitutes my China gloss, with which the last coat or coats are to be given to the work, and by which a new and beautiful effect will be produced, differing essentially in the high polish and general appearance from that of paint prepared in any other way.

When the composition is to be used for painting upon walls I vary the preparation of the varnish by adding to it at the time of making it and while hot one quart of the clarified oil to every gallon of the varnish, diminishing the quantity of spirits of turpentine in the same degree.

Having thus fully described the nature of my new composition of white paint and shown the manner in which I prepare the same, what I claim therein as new, and desire to secure by Letters Patent, is—

The preparing of my white paint by the use and employment of the oil clarified and bleached, as above set forth, in combination with the particular resin above named and denominated "gum-dammar" or "soft South American gum-copal," combined in the manner set forth, with spirits of turpentine and white lead, the whole being prepared and used substantially in the manner herein fully made known.

HENRY C. OTTO.

Witnesses:
S. E. HARLAN,
T. S. MURPHY.